(12) United States Patent
Brys et al.

(10) Patent No.: US 6,861,769 B1
(45) Date of Patent: Mar. 1, 2005

(54) APPARATUS AND METHOD FOR PROTECTION OF AN ELECTRONIC CIRCUIT

(75) Inventors: Wieslaw Brys, Bedford, MA (US); Juan Guzman, Jr., Shrewsbury, MA (US); Witold Wrotek, Stow, MA (US); Michael A. Garrett, Worcester, MA (US)

(73) Assignee: White Electronic Designs Corp., Phoenix, AZ (US)

( * ) Notice: Subject to any disclaimer, the term of this patent is extended or adjusted under 35 U.S.C. 154(b) by 307 days.

(21) Appl. No.: 10/016,042

(22) Filed: Nov. 16, 2001

Related U.S. Application Data
(60) Provisional application No. 60/249,220, filed on Nov. 16, 2000.

(51) Int. Cl.[7] .................................................. H02J 7/00
(52) U.S. Cl. .............................. 307/64; 307/66; 307/80; 307/85; 307/86
(58) Field of Search .............................. 307/64, 66, 80, 307/85, 86

(56) References Cited

U.S. PATENT DOCUMENTS

| | | | |
|---|---|---|---|
| 5,307,318 A | * | 4/1994 | Nemoto ...................... 365/226 |
| 5,345,424 A | | 9/1994 | Landgraf |
| 5,438,536 A | | 8/1995 | Salzman |
| 5,509,134 A | | 4/1996 | Fandrich et al. |
| 5,862,046 A | * | 1/1999 | Farine et al. .................. 363/50 |
| 5,991,221 A | | 11/1999 | Ishikawa et al. |
| 6,426,571 B1 | * | 7/2002 | Doron .......................... 307/66 |

* cited by examiner

Primary Examiner—Robert L. DeBeradinis
(74) Attorney, Agent, or Firm—Joseph Stecewycz

(57) ABSTRACT

An apparatus and method for the protection of an electronic circuit against anomalies in a supplied power voltage where the apparatus includes: a reserve power source connected to the supplied power voltage for providing voltage to the electronic circuit for a predetermined amount of time after an anomaly has occurred in the supplied power voltage, a module control for maintaining selected data and control signals transmitted to the electronic circuit during occurrence of the anomaly, and a differential comparator connected to the supplied power voltage and to the reserve power source to produces a comparator control signal upon occurrence of the anomaly, the differential comparator providing the comparator control signal to the module control.

20 Claims, 4 Drawing Sheets

APPARATUS AND METHOD FOR PROTECTION OF AN ELECTRONIC CIRCUIT

CROSS-REFERENCE TO RELATED APPLICATION

The present Application is related to Provisional Patent Application entitled "Memory module protection circuit" filed 16 Nov. 2000 and assigned Ser. No. 60/249,220.

BACKGROUND OF THE INVENTION

1. Field of Invention

The present invention relates to the protection of electronic circuitry and, in particular, to the protection of a memory circuit from the effects of a power supply anomaly.

2. Description of the Background Art

As understood by one skilled in the relevant art, when the supply of electrical power to most conventional microprocessors or electronic circuits is interrupted or falls outside a specified voltage range, there results a non-conforming or an undesirable output from the affected microprocessor or electronic circuit. For example, if a voltage drop or other power anomaly occurs as data is being written to a memory device in a computer system, a portion of the data in the process of being written may be corrupted or lost.

In some cases, power failure may not only interrupt a regular flow of operation, but may cause additional problems such as by writing corrupted data. Under certain situations an electronic system can withstand the effects of a power failure, but the system may otherwise malfunction as a result of data corruption. The data may not be written or, worse yet, may be written incorrectly.

What is needed is a protective system and method which will allow an electronic circuit or module to complete internal operation before the effects of a power failure are realized

SUMMARY OF THE INVENTION

The disclosed device and method serve to insure the continued, proper operation of a protected microprocessor-controlled electronic circuit, subsequent to the onset of an unexpected power source anomaly.

DETAILED DESCRIPTION OF THE INVENTION

Figure 1:
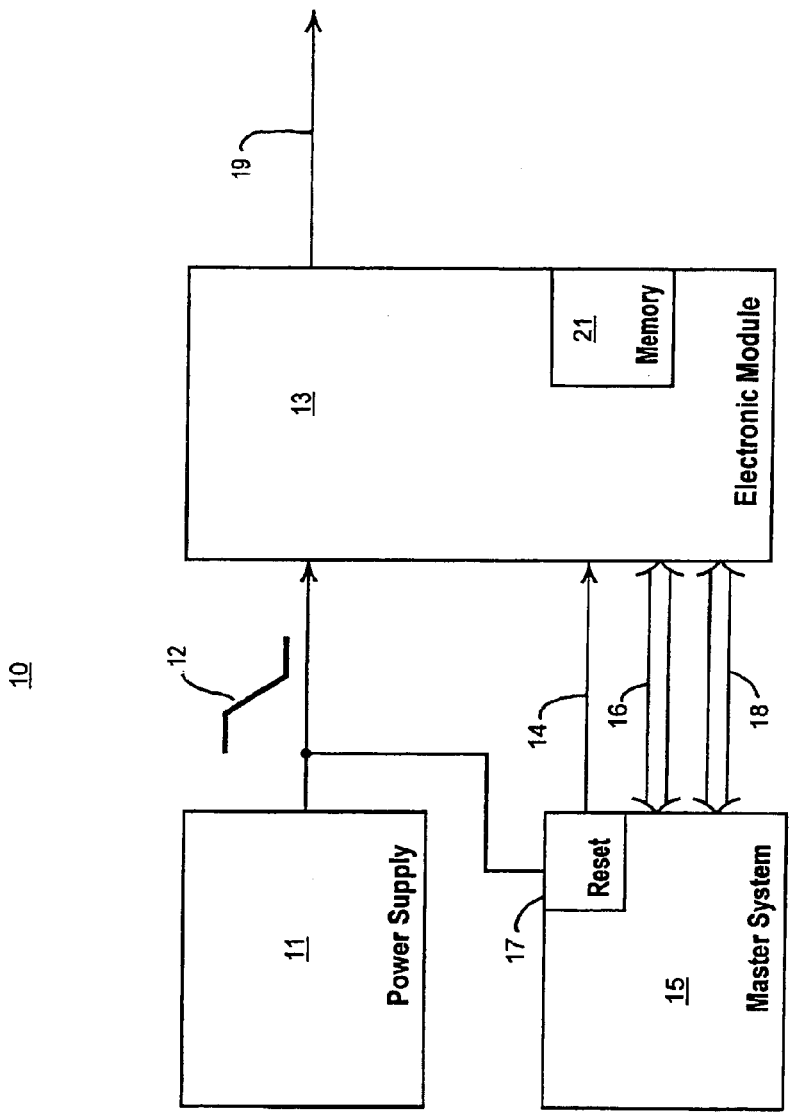
FIG. 1 is a functional block diagram of a conventional electronic system including a power supply, a master control system, and an electronic module with a memory.

There is shown in FIG. 1 a simplified block diagram of an electronic system 10 in which the present invention may be advantageously used. The electronic system 10 includes a power supply 11 providing electrical power to an electronic module 13 and to a master system 15. The master system 15 provides control signals 16 and exchanges data 18 with the electronic module 13. As long as the power supply 11 continues to provide uninterrupted voltage within a specified range, the electronic module 13 functions normally, to store data in a memory 21, or to provide valid output signals 19 to a printer, for example. However, when the voltage from the power supply 11 falls outside the specified range, a power failure occurs, as represented by a falling step waveform 12. When the power failure occurs, normal operation of the electronic module 13 and/or the output signal 19 may be affected.

The master system 15 typically includes a reset circuit 17 which senses the output of the power supply 11 in order to detect abnormal voltage levels or changes. When an abnormality occurs, the reset circuit 17 generates an external reset signal 14 to terminate, or invalidate, actions subsequent to the occurrence of the erroneous control signals. The external reset signal 14 may also interrupt or terminate the internal operations initiated by the electronic module 13.

Problems arise when operations internal to the electronic module 13 are interrupted during a power failure, with the operations left in indeterminate states. Moreover, when power failure occurs, the control signals 16 generated by the master system 15 may inadvertently change states (i.e., between high and low values) producing erroneous control signals and generating false actions.

In accordance with the present invention, the above-described problems are mitigated by means of protection circuitry provided in the electronic module 13 as described in greater detail below. The protection circuitry preferably includes a reserve source of energy to provide additional electrical power by which the internal operations already initiated by the electronic module 13 may be completed correctly. Additionally, the external reset signal 14 and critical control signals 16 are conditioned so as to mitigate or eliminate the occurrence of false actions.

Figure 2:
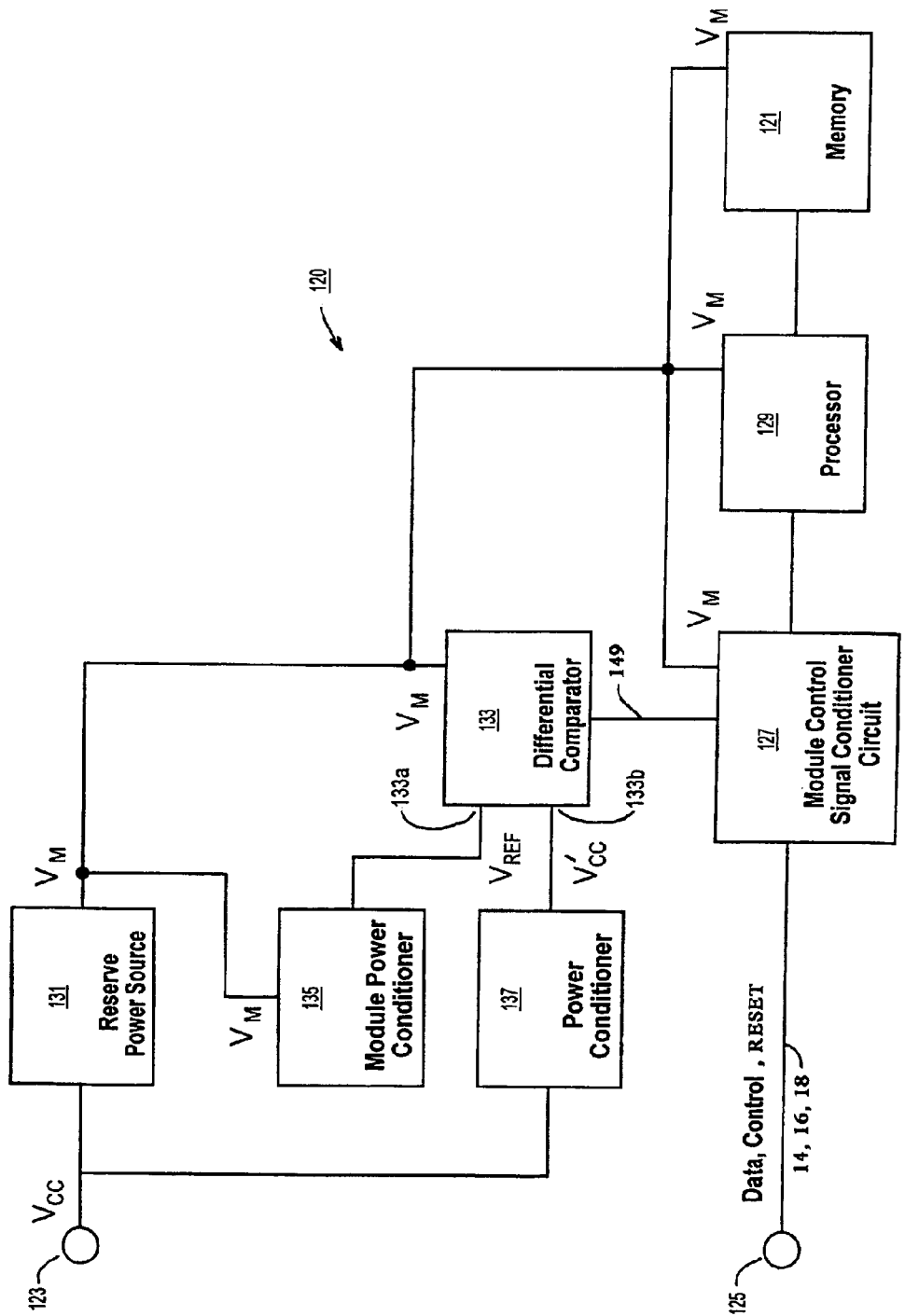
FIG. 2 is a functional block diagram of a memory module including a differential comparator, a power port for receiving electrical power, and a data/control port for receiving data and control signals.

There is shown in FIG. 2 a simplified functional block diagram of a preferred embodiment of a memory module 120 in accordance with the present invention. The memory module 120 includes a power port 123, for receiving electrical power ($V_{CC}$), such as provided by the power supply 11 of FIG. 1, and a data/control port 125, for receiving data and control signals, such as the reset signal 14, the control signals 16, and the data 18. In the configuration shown, the memory module 120 functions to provide protection against power source anomalies to a processor 129 and a memory 121, such as a flash memory.

Power received at the power port 123 is provided to a reserve power source 131. The reserve power source 131 performs two functions. First, the reserve power source 131 provides power to other components of the memory module 120 as a module voltage ($V_M$). Secondly, the reserve power source 131 insures that the module voltage $V_M$ is maintained for a predetermined amount of time (denoted as $\Delta t$) after an anomaly or a failure has occurred in the received power voltage $V_{CC}$. To maintain the module voltage $V_M$ in this way, the reserve power source 131 includes a reserve supply of electrical energy and further includes an electrical switch to prevent discharging when $V_{CC}$ goes low. This reserve supply may comprise, for example, a battery, a capacitance, or an inductance, and the switch may comprise a diode or a transistor.

The data 18 and the control signals 16 received by the memory module 120 at the data/control port 125 are transmitted through a module control signal conditioner circuit 127. The module control signal conditioner circuit 127 maintains critical signals (e.g., data 18 and control 16) during power failure so as to eliminate false operation. Upon detection of a power failure condition, the module control signal conditioner circuit 127 will force, or hold, the critical signals in inactive states. This action provides for the completion, without interruption, of operations already initiated by the memory module 120, including the operation of the external reset signal 14. In a preferred embodiment, the memory 121 comprises a solid-state device resident on the same card as the processor 129. Alternatively, the memory 121 may comprise a removable storage medium such as a magnetic or optical disk.

Upon the occurrence of an anomaly or failure in the received power voltage $V_{CC}$, the module control signal conditioner circuit 127, which is controlled by a differential comparator 133 via a control line 149, reacts to set and hold all critical control signals, including the external reset signal 14, in inactive states. This action is taken to prevent the transmission of any erroneous signals resulting from a change in logic states in response to the drop in power voltage $V_{CC}$.

Anomalies in the received power are detected by the differential comparator 133. The differential comparator 133 compares the voltage of the electrical power $V_{CC}$ received at a comparator port 133b with a reference voltage ($V_{REF}$) received at a comparator port 133a. The reference voltage $V_{REF}$ is obtained from the module power voltage $V_M$. The module power voltage $V_M$ is filtered via a module power conditioner circuit 135, and the received electrical power $V_{CC}$ is filtered via a power conditioner circuit 137 to produce a filtered power signal $V'_{CC}$. This filtering serves to further eliminate any false power failure detection.

Figure 3:
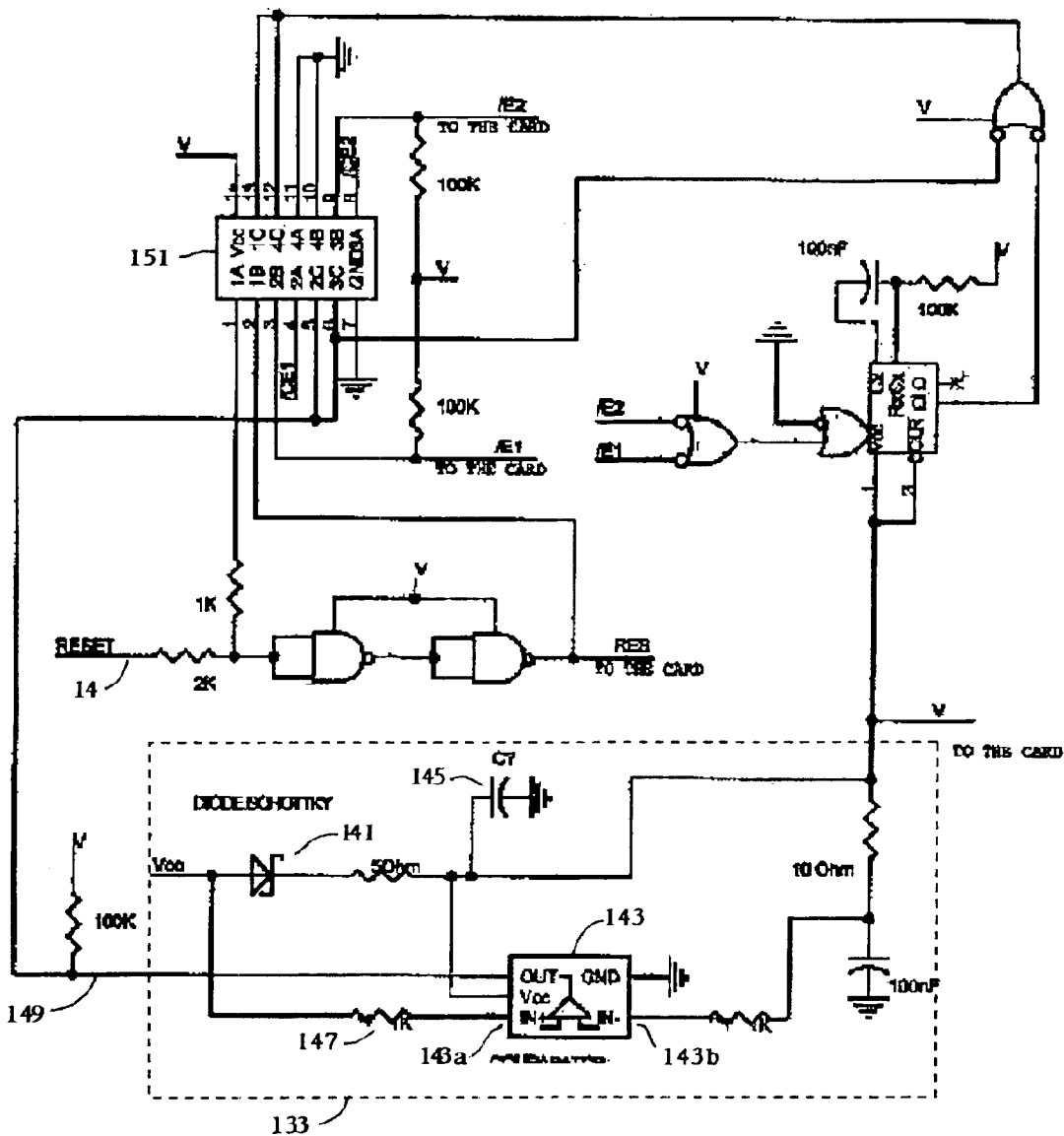
FIG. 3 is a preferred embodiment of the differential comparator of FIG. 2.

FIG. 3 shows the differential comparator 133 in communication with a microprocessor 151, wherein the differential comparator 133 operates to provide a control signal to the microprocessor via the control line 149. The reset signal 14 is also provided to the microprocessor 151. The differential comparator 133 includes a comparator 143 which receives two voltage signals as shown. The electrical power $V_{CC}$ signal is applied to the anode of a diode 141, such as a Schottky diode, and to a first comparator port 143a via a resistor 147. A second voltage signal is applied to a second comparator port 143b. It can be appreciated by one skilled in the relevant art that a capacitance 145 serves to maintain the amplitude of the second signal presented to the second comparator port 143b for a predetermined time after the first voltage signal has begun to decrease following a power anomaly.

Figure 4:
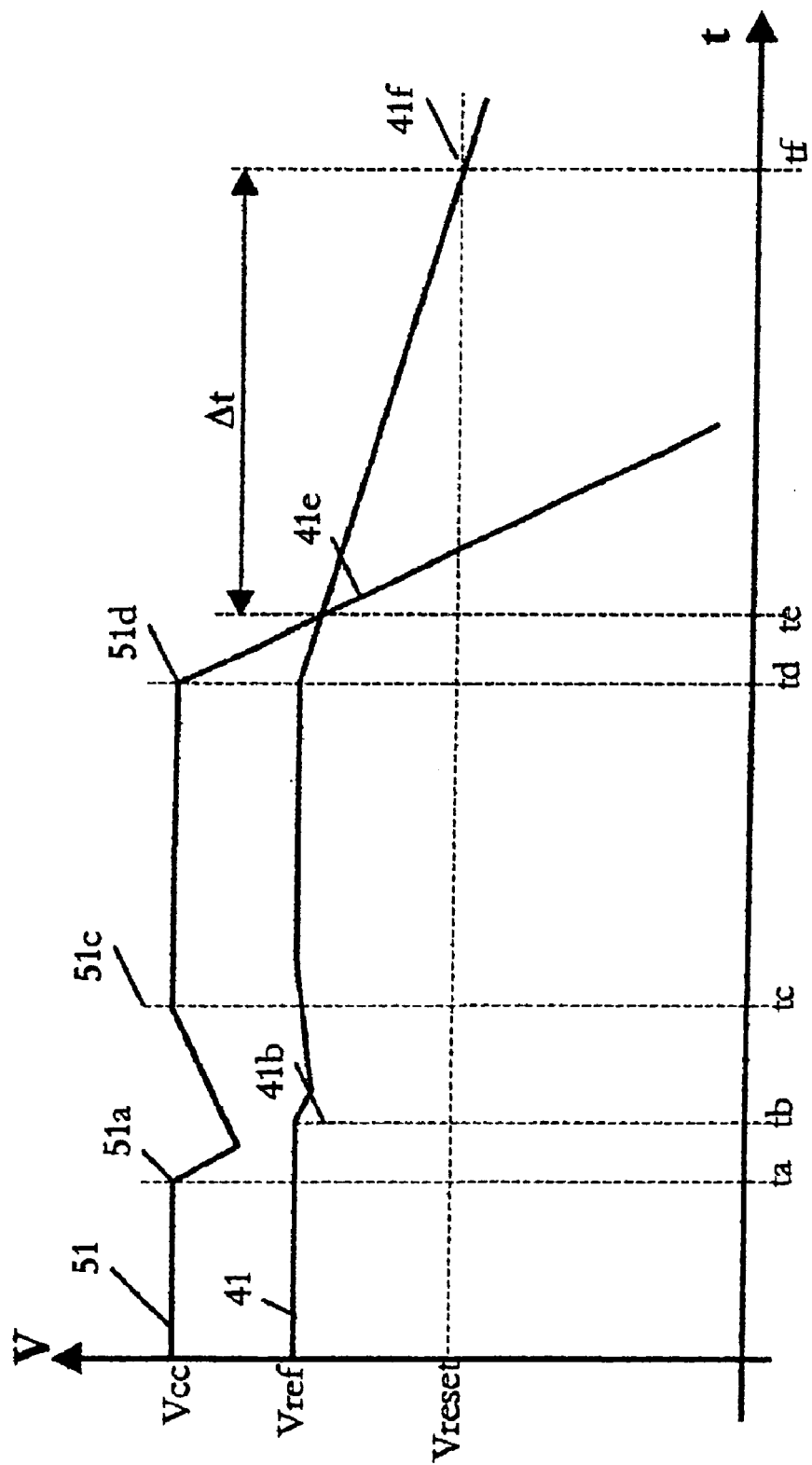
FIG. 4 is a graph illustrating a first waveform representing a reference voltage and a second waveform representing a received power voltage input to the differential comparator of FIG. 2.

Operation of the memory module 120 can be explained with additional reference to FIG. 4 in which is shown waveforms 41 and 51. The waveform 41 represents the reference voltage $V_{REF}$ input to the first comparator port 133a. The waveform 51 represents the received power voltage $V_{CC}$ input to the second comparator port 133b.

In the example provided, the waveform 51 shows a minor voltage fluctuation 51a occurring between a time $t_a$ and a time $t_c$. There may result a corresponding voltage fluctuation 41b occurring in the waveform 41 at a time $t_b$. The fluctuations 51a and 41b are of sufficiently small magnitudes and durations that operation of the memory module 120 is not affected. In a preferred embodiment, the differential comparator 133 is designed to exhibit hysteresis during operation. This hysteresis feature serves to make the differential comparator 133 less sensitive to such minor voltage fluctuations which may occur during normal operation of the memory module 120.

In contrast, the operation of the memory module 120 is affected when interruptions to the received electrical power voltage $V_{CC}$ and to the reference voltage $V_{REF}$ occur, such as at a time $t_d$. In the example provided, the received electrical power $V_{CC}$ voltage drop following reference point 51d is sufficiently large to drop below the level of the reference voltage $V_{REF}$, at time $t_e$. At a later time $t_f$, the reference voltage $V_{REF}$ has decreased to a value denoted by $V_{RESET}$, the voltage level at which an internal reset signal is generated by the module control signal conditioner circuit 127, which terminates any internal operations of the memory module 120 subsequent to the time $t_f$. It should be understood that, at time $t_f$, all internal operations have been completed and that the module voltage $V_M$ is still at the proper value. The time interval ($t_f$-$t_e$) is denoted as $\Delta t$, or 'backup time.'

When the received electrical power voltage $V_{CC}$ falls below the reference voltage $V_{REF}$ subsequent to time $t_e$, the differential comparator 133 will interpret this situation as a power failure event. In response to such a power failure event, the differential comparator 133 will force a backup operation and will trigger a protected mode operation. As can be appreciated by one skilled in the relevant art, the module voltage $V_M$ may correspondingly fall below the predetermined voltage threshold (i.e., an $V_{RESET}$). This drop in the module voltage $V_M$ will cause undefined behavior in the memory module 120. Thus, the internal reset signal is provided to block any module activity subsequent to this condition, which occurs at time $t_f$.

In summary, the occurrence of the minor fluctuation 51a will not result in disruption, and the memory module 120 will continue to function normally. However, when the difference between the reference voltage $V_{REF}$ and the received electrical power voltage $V_{CC}$ becomes sufficiently small, as shown at time $t_e$, continued operation of the memory module 120 beyond the time $t_c$, may result in, for example, corrupted data being written to the memory 131.

To prevent the writing of corrupted data, or other operational problems, the module control circuit 127 reacts to the detected power failure event at time $t_e$ holding the external reset signal 14 and the critical control signals in inactive states. Otherwise, issuance of the external reset signal 14, for example, while certain operations have not been completed could result in the undesirable operational problems. The external reset signal 14 is held in an inactive state for at least the backup time interval of $\Delta t$.

As explained above, the reserve power source 131 is configured to maintain the module voltage $V_M$ essentially constant, that is, within allowed limits, during the backup time interval $\Delta t$. The backup time interval $\Delta t$ is specified as the period of time required to complete a particular, critical module operation. For example, in the memory module 120, the time interval $\Delta t$ may be specified as the time required to complete a cycle of data transfer, as in a write-to-flash operation, typically 5 to 500 $\mu$sec.

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. An apparatus for protection of an electronic circuit against anomalies in a supplied power voltage, said apparatus comprising:

a reserve power source connected to the supplied power voltage, said reserve power source for providing a module voltage to the electronic circuit and further for maintaining said module voltage for a predetermined amount of time after an anomaly has occurred in the supplied power voltage;

a module control for receiving and maintaining selected data and control signals transmitted to the electronic circuit during occurrence of said anomaly in the supplied power voltage; and a differential comparator connected to the supplied power voltage and to said reserve power source such that said differential comparator produces a comparator control signal upon occurrence of said anomaly in the supplied power voltage, said differential comparator further connected to said module control for providing said comparator control signal to said module control.

2. The apparatus of claim 1 wherein said differential comparator comprises a capacitance for maintaining said module voltage in said differential comparator for said predetermined amount of time after said anomaly has occurred in the supplied power voltage.

3. The apparatus of claim 1 wherein said reserve power source comprises at least one of a battery, a capacitance, and an inductance for maintaining said module voltage for said predetermined amount of time after said anomaly has occurred in the supplied power voltage.

4. The apparatus of claim 3 wherein said reserve power source further comprises at least one of a diode switch or a transistor switch adapted to prevent discharging of said module voltage if the supplied power voltage decreases.

5. The apparatus of claim 1 wherein said differential comparator comprises a comparator for receiving both said module voltage and the supplied power voltage, said comparator further producing said comparator control signal after said anomaly has occurred in the supplied power voltage.

6. The apparatus of claim 5 wherein said comparator forces a backup operation and triggers a protected operation when the supplied power voltage drops below said module voltage.

7. The apparatus of claim 5 wherein said differential comparator further comprises a Schottky diode disposed between the supplied power voltage source and said module voltage source.

8. The apparatus of claim 1 wherein said predetermined amount of time is about 5 to 500 $\mu$sec.

9. The apparatus of claim 1 further comprising at least one power conditioner disposed between the supplied power voltage source and said differential comparator.

10. The apparatus of claim 1 wherein said module control functions to hold an external reset signal in an inactive state in response to said occurrence of said anomaly in the supplied power voltage.

11. A method for protecting an electronic circuit against anomalies in a supplied power voltage, said method comprising the steps of:

connecting a reserve power source to the supplied power voltage, said reserve power source for providing an apparatus voltage to the electronic circuit and for maintaining said apparatus voltage for a predetermined amount of time after an anomaly has occurred in the supplied power voltage;

connecting a differential comparator to the supplied power voltage and to said reserve power source such that said differential comparator produces a comparator control signal upon occurrence of said anomaly in the supplied power voltage; and providing said comparator control signal to a module control for controlling the electronic circuit, said module control for receiving and maintaining selected data and control signals transmitted to the electronic circuit.

12. The method of claim 11 further comprising the step of maintaining, via said module control, selected data and control signals transmitted to the electronic circuit during occurrence of said anomaly in the supplied power voltage.

13. The method of claim 11 further comprising the step of providing a capacitance in said differential comparator, said capacitance for maintaining said module voltage in said differential comparator for said predetermined amount of time after said anomaly has occurred in the supplied power voltage.

14. The method of claim 11 further comprising the step of providing at least one of a battery, a capacitance, and an inductance in said reserve power source, for maintaining said module voltage in said reserve power source for said predetermined amount of time after said anomaly has occurred in the supplied power voltage.

15. The method of claim 14 further comprising the step of providing an electronic switch in said reserve power source.

16. The method of claim 15 further comprising the step of activating said switch if the supplied power voltage decreases, said switch activation functioning to prevent discharging of said module voltage from said reserve power source.

17. The method of claim 11 further comprising the step of filtering at least one of the supplied power voltage and said module voltage.

18. The method of claim 11 further comprising the step of detecting said anomaly when the supplied power voltage drops below said module voltage.

19. The method of claim 11 wherein said predetermined amount of time is about 5 to 500 $\mu$sec.

20. The method of claim 11 further comprising the step of holding a reset signal in an inactive state for at least said predetermined amount of time after said anomaly has occurred in the supplied power voltage, said reset signal adapted for transmittal to the electronic circuit.

* * * * *